(12) United States Patent
Dahl et al.

(10) Patent No.: US 11,060,508 B2
(45) Date of Patent: Jul. 13, 2021

(54) LIGHTNING RECEPTOR FOR A ROTOR BLADE OF A WIND TURBINE

(71) Applicant: Siemens Gamesa Renewable Energy A/S, Brande (DK)

(72) Inventors: Flemming Dahl, Hals (DK); Yannick Cao van Truong, Aalborg (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 119 days.

(21) Appl. No.: 16/461,676

(22) PCT Filed: Oct. 19, 2017

(86) PCT No.: PCT/EP2017/076682
§ 371 (c)(1),
(2) Date: May 16, 2019

(87) PCT Pub. No.: WO2018/095660
PCT Pub. Date: May 31, 2018

(65) Prior Publication Data
US 2019/0353145 A1 Nov. 21, 2019

(30) Foreign Application Priority Data
Nov. 22, 2016 (DE) .......................... 102016223012.3

(51) Int. Cl.
F03D 80/30 (2016.01)
(52) U.S. Cl.
CPC .................................... F03D 80/30 (2016.05)

(58) Field of Classification Search
CPC ...................................................... F03D 80/30
See application file for complete search history.

(56) References Cited

U.S. PATENT DOCUMENTS 10,288,044 B2 * 5/2019 Olsen ...................... F03D 80/30
2016/0258423 A1 9/2016 Whitehouse et al.

FOREIGN PATENT DOCUMENTS

| CN | 201679646 U | * 12/2010 |
| CN | 201679646 U | 12/2010 |
| CN | 105829708 A | 8/2016 |
| EP | 2722522 A1 | 4/2014 |
| WO | 2011080177 A1 | 7/2011 |
| WO | WO 2011080177 A1 | 7/2011 |

(Continued)

OTHER PUBLICATIONS

Office Action in related Chinese Patent Application No. 201780072375. 0, dated Mar. 20, 2020. 6 pages.

(Continued)

Primary Examiner — Juan G Flores
(74) Attorney, Agent, or Firm — Schmeiser, Olsen & Watts LLP

(57) ABSTRACT

Provided is a rotor blade of a wind turbine, the rotor blade including a lightning protection system with at least one lightning receptor, wherein the lightning receptor includes a receptor part which protrudes from the surface of the rotor blade. Furthermore, the section of the receptor part with the maximum lateral extension is spaced apart from the surface of the rotor blade. Additionally, a lightning receptor for such a rotor blade and to a wind turbine for generating electricity comprising at least one such rotor blade, is also provided.

15 Claims, 6 Drawing Sheets

(56) References Cited

FOREIGN PATENT DOCUMENTS

WO      2016165714 A1   10/2016
WO   WO 2016165714 A1   10/2016

OTHER PUBLICATIONS

International Search Report and Written Opinion in related PCT Application No. PCT/EP2017/076682, dated Jan. 19, 2018. 17 pages.
International Search Report dated Jan. 19, 2019 for Application No. PCT/EP2017/076682.

* cited by examiner

LIGHTNING RECEPTOR FOR A ROTOR BLADE OF A WIND TURBINE

CROSS-REFERENCE TO RELATED APPLICATIONS

This application claims priority to PCT Application No. PCT/EP2017/076682, having a filing date of Oct. 19, 2017, which is based on German Application No. 10 2016 223 012.3, having a filing date of Nov. 22, 2016, the entire contents both of which are hereby incorporated by reference.

FIELD OF TECHNOLOGY

The following relates to a rotor blade of a wind turbine with a lightning protection system, wherein the lightning protection system comprises at least one lightning receptor of which a part protrudes from the surface of the rotor blade, and to a lightning receptor and to a wind turbine for generating electricity comprising such a rotor blade with such a lightning receptor.

BACKGROUND

Damages due to lightning strikes are a serious challenge for wind turbines. Especially the wind turbine's rotor blades are exposed to the risk of being damaged. Therefore, it is well known and well established that rotor blades of a wind turbine need a lightning protection system. This is particularly important in light of ever growing size of the wind turbines, namely with increasing height of the hub and increasing length of the rotor blades.

Conventional lightning protection systems comprise typically one or several lightning receptors which are embedded into the blade shell laminate and connected to a lightning conductor, wherein the lightning conductor is arranged and prepared to guide the electrical current received from the lightning strike to the ground. Alternatively or additionally to lightning receptors, a mesh can be applied on parts of the surface of the rotor blade for attracting and receiving lightning strikes.

The lightning receptors which are embedded into the blade shell laminate have the advantage that they have a minimum impact in terms of aerodynamic drag and generated noise. If the lightning receptor is flush with the surface of the rotor blade, the impact for the airflow flowing across the surface of the rotor blade is generally negligible.

Alternatively, lightning receptors may also protrude from the surface. This may have the advantage to better capture the lightning strikes. Examples of lightning receptors according to the state of the art are given in FIGS. 3 and 4 of the present patent application.

A problem of existing lightning protection systems is, however, that still a considerable amount of lightning penetrates the blade shell laminate anywhere else than the lightning protection system termination, such as the lightning receptors. Note that it is in general uncritical if the lightning strikes the rotor blade, runs on the blade surface and penetrates the blade shell laminate through the lightning receptor system. However, a potential damage to the rotor blade is caused if penetration of the lightning occurs directly into the blade shell laminate. Such an event can lead to severe damages to the rotor blade. As a consequence, after one or several such lightning strikes repair works are necessary in order to ensure a high performance of the wind turbine. Such repair works on rotor blades are particularly costly if the wind turbine is difficultly accessible, such as in remote areas or offshore.

Therefore, there exists the wish to provide a concept how to further reduce the risk of a damage of the rotor blade due to lightning strikes.

SUMMARY

According to the embodiment of the invention, there is provided a rotor blade of a wind turbine comprising a lightning protection system. The lightning protection system comprises at least one lightning receptor, wherein the lightning receptor comprises a receptor part which protrudes from the surface of the rotor blade. The lightning receptor is characterized in that the section of the receptor part with the maximum lateral extension is spaced apart from the surface of the rotor blade.

The receptor part of the rotor blade is defined as this part of the lightning receptor which receives, i.e. which "attracts" the lightning. Every lightning receptor comprises such a receptor part. Some lightning receptors comprise a receptor part which protrudes, in other words sticks out, from the surface of the rotor blade. Other lightning receptors comprise a receptor part which is flush with the surface of the rotor blade. These lightning receptors does not have a receptor part which protrudes from the surface. In distinction to conventional lightning receptors, the inventive lightning receptor is characterized in that it comprises a specifically designed protruding receptor part. The specifically designed, inventive receptor part has the technical feature that its maximum lateral extension, namely the maximum lateral extension of the receptor part, is arranged apart from the surface of the rotor blade. In other words, the receptor part does not exhibit its maximum lateral extension at the surface of the rotor blade, but is spaced apart further outwards.

This design has the advantage that, compared to embedded lightning receptors which are flush with the surface of the rotor blade, a greater "receptor attachment surface" is provided. This gives a greater attraction area for attracting lightning strikes. Furthermore, it has been proven that if there is a certain layer of air between the receptor part of the lightning receptor and the surface of the rotor blade, the attractiveness of the lightning receptor for receiving lighting strikes is enhanced as well. This "air separation layer" is realized in practice by the fact that the section of the receptor part with the maximum lateral extension is spaced apart at a distance from the surface of the rotor blade.

Furthermore, it is advantageous if the receptor part has relatively sharp edges or rims. This also enhances the probability that the lightning strike is captured by the lightning receptor. Therefore, it is beneficial to design the receptor part such that the curvature of the receptor part is greatest at the section of the receptor part with the maximum lateral extension. Descriptively speaking, a receptor part of a lightning receptor according to the present embodiment of the invention may also be referred to as a lightning receptor comprising a "mushroom shape".

In an embodiment of the invention, the lateral extension of the receptor part increases from the surface of the rotor blade until the section of the receptor part with the maximum lateral extension.

This (optional) feature is (also) destined to create an area between the surface of the rotor blade and the lower side of the receptor part—wherein the lower side of the receptor part is defined as that side or area of the receptor part which is facing the rotor blade surface—in order to create an layer of air between the lower side of the receptor part and the surface of the rotor blade.

In another embodiment of the invention, the maximum lateral extension of the receptor part is greater than the maximum extension of the receptor in a plane perpendicular to the surface of the rotor blade.

In other words, the lateral extension of the receptor part shall be greater than the thickness, i.e. the height, of the receptor part. This is beneficial because a low height of the receptor part is advantageous for the aerodynamic properties. In general, the lower the height of the receptor part, the lower the aerodynamic drag of the receptor part. Conversely, a great lateral extension is beneficial because, thus, a great area by which lightning strikes are attracted is achieved.

The notion "lateral" is meant to be the direction which is substantially parallel to the surface of the rotor blade at the section of the rotor blade where the lightning receptor is present. In other words, the lateral extension of the receptor part is perpendicular to the orthogonal direction relative to the surface of the rotor blade.

In another embodiment of the invention, the receptor part comprises a through-hole for inserting a fastener for fixing the lightning receptor to the remaining rotor blade, in particular for fixing the lightning receptor to a lightning conductor of the rotor blade.

Obviously, the lightning receptor needs to be attached somehow to the remaining rotor blade. This is beneficially carried out by a fastener, such as a screw or a bolt. Alternatively, also an adhesive connection is possible, but a connection via a fastener has in general the advantage to give a good long-term stability.

Apart of the receptor part, also a connection part can be defined for the lightning receptor. The connection part is defined as that part of the lightning receptor which builds the connection between the receptor part and the lightning conductor, in particular a lightning conductor block. Note that the lightning conductor is sometimes also referred to as the "lightning down conductor" and the lightning conductor block is referred to as the "lightning down conductor block".

In another embodiment of the invention, the receptor part comprises a stem and a cap. The cap comprises the section of the receptor part with a maximum lateral extension and the stem connects the cap with the surface of the rotor blade, thus contributing further that the section of the receptor part with the maximum lateral extension is spaced apart from the surface of the rotor blade.

The "stem and cap design" is particularly directed to the so-called "mushroom shape design" of the lightning receptor. The stem can be seen as an extension of the connection part of the lightning receptor. In any case the stem further contributes to keep the receptor part and, in particular, the section of the maximum lateral extension of the receptor part away from the surface of the rotor blade. Therefore, the air layer or air cushion between the lower side of the receptor part and the surface of the rotor blade is increased.

Another aspect of the embodiment of the invention is the at least partial covering of the receptor part of the lightning receptor by an electrically conductive cover, wherein the cover is at least partially spaced apart from the receptor part by a non-conductive material, for instance air.

The additional cover is destined to further increase the lightning strike attraction potential of the lightning receptor. The present inventors have realized that in the state of the art these areas of the rotor blade which show delamination or other air inclusions are particularly hit and damaged by lightning strikes. Therefore, air inclusions in the blade shell laminate are supposed to attract lightning in a particular manner. By benefiting from this finding and by its technical realization, the cover which is at least partially covering the receptor part and introducing a layer of a non-conductive material is proposed herewith. Note that such an electrically conductive cover which is at least partially separated from the receptor part by a non-conductive material can in principle be applied to a lightning receptor of any shape and any design. Thus, this concept of covering the receptor part of the lightning receptor can also be applied to state of the art lightning receptors as shown, for instance, in FIGS. 3 and 4 of the present application. Possible explanations for the identified technical effect of a boost in lightning strike attraction potential are as follows:

First, a higher electrical field around such a covered lightning receptor is observed, compared to standard, plane metallic lightning receptors. A higher electrical field means that a concentration point for building up leaders and consequently supporting the lightning attachment to this point can be observed because of an electrode built up between the layers.

Second, a higher capacitive potential by such a lightning receptor is observed, which is above the inductive potential of standard lightning receptors. This capacitive potential also contributes to an increase in the lightning attraction potential of the lightning receptor.

Finally, a breakdown voltage on the surfaces is lower than the air breakdown voltage, meaning that the lightning strike prefers to run on surfaces or between layers. This supports to prevent any lightning attachment such as a lightning penetration into the blade shell structure outside the covered lightning receptor.

Exemplarily, the electrically conductive cover is designed and arranged such with regard to the receptor part that a plurality of air inclusions are present between the cover and the receptor part. This leads to the formation of the at least partial spacing of the cover from the receptor part of the lightning receptor.

The provision of air inclusions are one possible way to realize the proposed separation of the receptor part of the lightning receptor by non-conductive material, such as air. The provision of air inclusions is also consistent with the observed fact that lightning strikes tend to strike preferably on delaminated areas of the blade shell laminate.

In another embodiment of the invention, the receptor part is at least partially covered by at least one further electrically conductive cover, and the further electrically conductive cover is arranged between the non-conductive material and the receptor part. Furthermore, the cover is at least partially spaced apart from the further cover by a non-conductive material, in particular air.

In other words, one option is to not only arrange one electrically conductive cover, but several electrically conductive covers upon at least parts of the surface of the receptor part.

As an example, the first electrically conductive cover may be directly attached to the surface of the receptor part, while the second electrically conductive cover is then further covering the receptor part. In order to ensure a sufficient distance between the two electrically conductive covers, a plurality of spacers are proposed. In the case that the lightning receptor and especially the receptor part of the lightning receptor comprises a rotationally symmetric shape about an axis which is substantially perpendicular to the surface of the rotor blade, these spacers may have the shape of rings with different radii.

In another embodiment of the invention, the cover and/or the further cover is realized as a flexible sheet which is capable to adapt to curved surfaces.

This flexible sheet may, for example, be a foil or the like, which can be easily put onto a receptor part of the lightning receptor. These flexible sheets can be attached with each other and with the receptor part by an adhesive, for instance. To give another example, the foil i.e. the flexible sheet, may have a self-adhesive surface by which it can be applied and attached to the receptor part or to another yet existing cover sheet.

Alternatively, the cover and/or the further cover may also be realized as a rigid sheet.

In this case, the rigid sheet may be designed such that it does not directly cover the receptor part but preferably it is designed such that it easily provides a space for air between the rigid sheets. In the case of the rigid sheets these rigid sheets may have the shape of disks or flat rings with different radii.

In another embodiment of the invention, the cover has an opening for feeding, i.e. inserting a fastener through the cover, wherein the fastener is suitable for fixing the lightning receptor to a lighting conductor of the rotor blade.

Therefore, in the case that the lightning receptor is attached to the remaining rotor blade by means of a fastener, which is, for example, co-axially arranged with respect to the lightning receptor, it is advantageous to leave some open space in the cover through which the fastener can be inserted.

Note that the application of the electrically conductive cover being spaced apart from the receptor part of a lightning receptor is not limited to the specific shape of the lightning receptor, in particular the specific shape of the receptor part of the lightning receptor, as described above. Instead, the cover may in principle be applied to any kind of lightning receptors of a lightning protection system for a rotor blade of a wind turbine. Thus, the aspect of the embodiment of the invention regarding the electrically conductive cover may also be described as: There is provided a rotor blade of a wind turbine comprising a lightning protection system with at least one lightning receptor, wherein the lightning receptor comprises a receptor part, and wherein the receptor part is at least partially covered by an electrically conductive cover, and the cover is at least partially spaced apart from the receptor part by a non-conductive material, in particular air.

The embodiment of the invention is furthermore directed towards a wind turbine for generating electricity which comprises at least one rotor blade as described above.

Furthermore, the embodiment of the invention is directed to a lightning receptor as such, which basically comprises the features as disclosed above in connection with the rotor blade. This means that features which have been introduced and described in the context of embodiments of the inventive rotor blade may also apply to the lightning receptor as an individual piece. In particular, the lightning receptor for a rotor blade of a wind turbine comprises a receptor part, which is arranged and prepared to protrude from the surface of the rotor blade and it is characterized in that the section of the receptor part with the maximum lateral extension is designed to be spaced apart from the surface of the rotor blade.

The features of the lightning receptor which relate to its arrangement and to its location with respect to the rotor blade can also be attributed to the lightning receptor as such, because lightning receptors are normally designed and dimensioned with regard to their concrete attachment and use with the rotor blades. In other words, it can be said that during the design of the lightning receptor as such it can be determined and taken into account that the maximum lateral extension is spaced apart from the surface of the rotor blade, once that the lightning receptor is attached and connected to the rotor blade.

BRIEF DESCRIPTION

Some of the embodiments will be described in detail, with reference to the following figures, wherein like designations denote like members, wherein.

DETAILED DESCRIPTION

The drawings are in schematic form. Same or similar elements may be assigned and referenced by the same reference signs.

Figure 1:
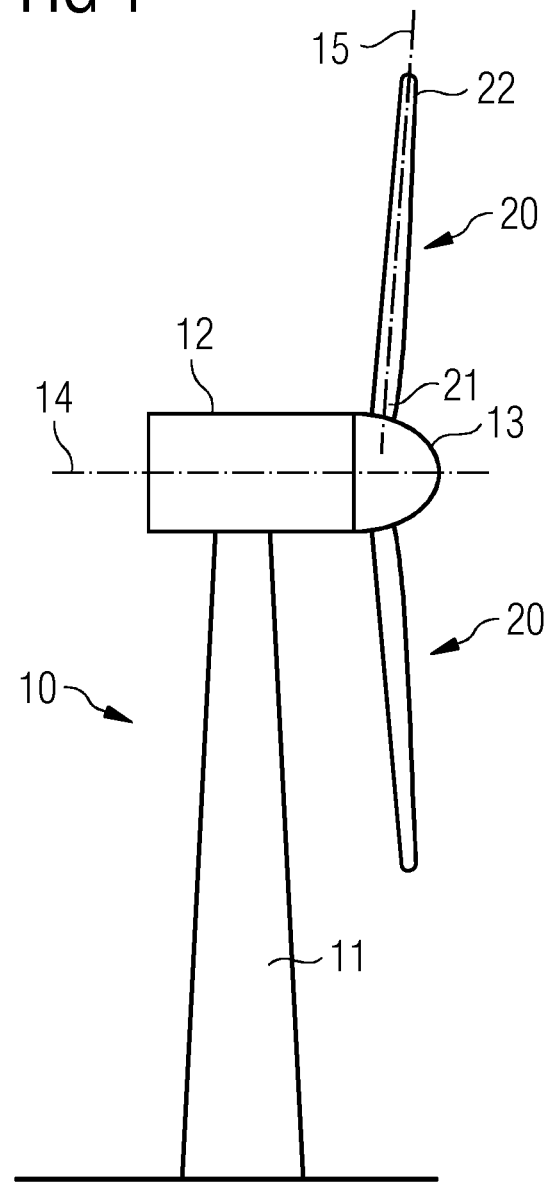
FIG. 1 shows a wind turbine for generating electricity.

FIG. 1 shows a conventional wind turbine 10 for generating electricity. The wind turbine 10 comprises a tower 11 which is mounted on the ground by one end. At the other end of the tower 11, there is mounted a nacelle 12. The nacelle 12 is usually mounted rotatable with regard to the tower 11, which is referred to as comprising a yaw axis substantially perpendicular to the ground. The nacelle 12 usually accommodates the generator of the wind turbine and the gear box (if the wind turbine is a geared wind turbine). Furthermore, the wind turbine 10 comprises a hub 13 which is rotatable about a substantially horizontal rotor axis 14. The hub 13 is often described as being a part of the rotor, wherein the rotor is capable to transfer the rotational energy to the generator.

The hub 13 is the part at which the rotor blades 20 are mounted. The rotor blade 20 is usually mounted pivotable to the hub 13. In other words, the rotor blades 20 can be pitched about pitch axes 15, respectively. This improves the control of the wind turbine and in particular of the rotor blades by the possibility to modify the direction at which the wind is hitting the rotor blades 20. Each rotor blade 20 is mounted to the hub 13 at its root section 21. The root section 21 is opposed to the tip section 22 of the rotor blade. Note that in the example as shown in FIG. 1, only two rotor blades 20 are depicted. However, most of the wind turbines nowadays comprise three rotor blades.

Figure 2:
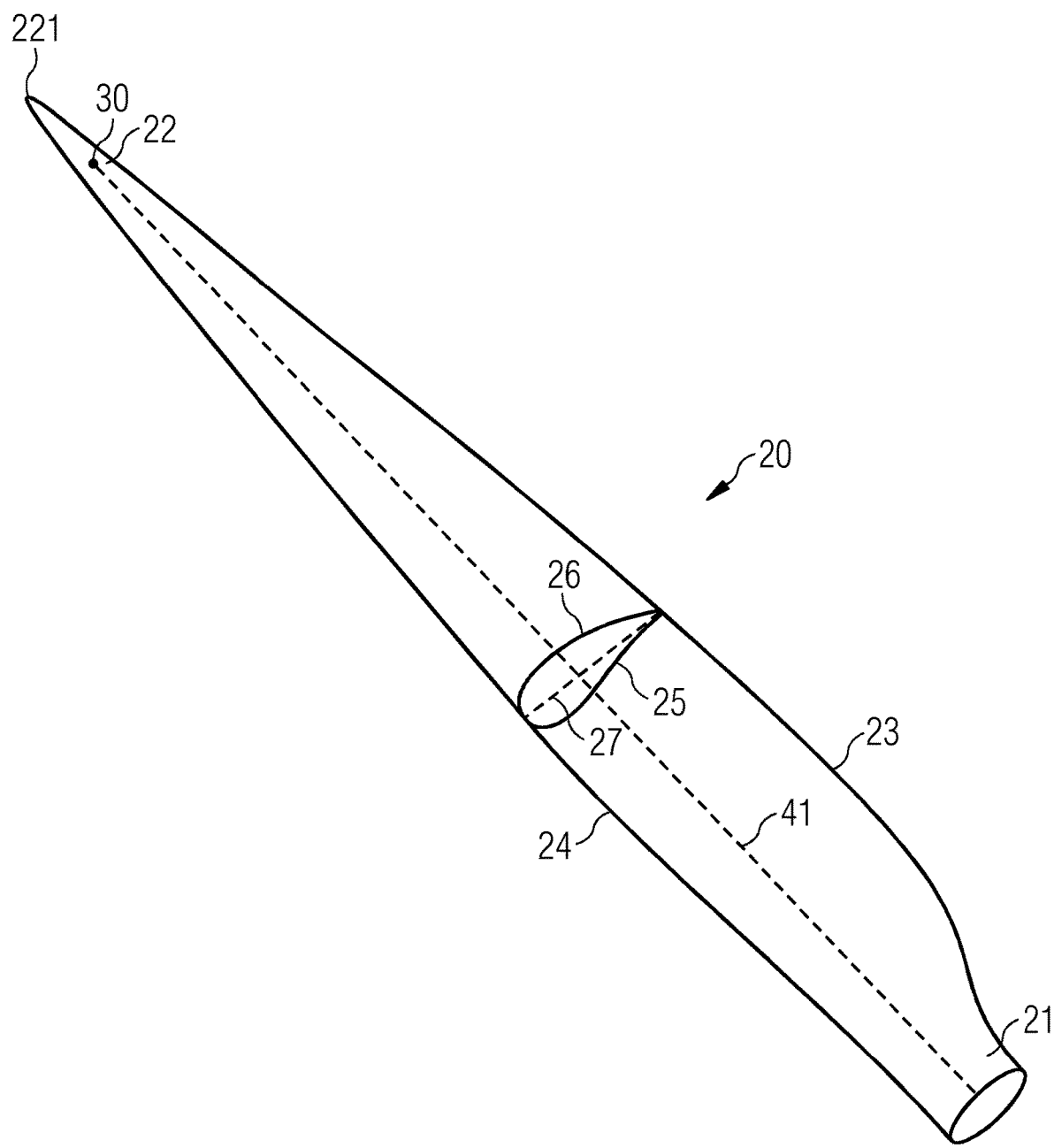
FIG. 2 shows a rotor blade of a wind turbine with a lightning protection system.

FIG. 2 shows such a rotor blade 20 of a wind turbine comprising a root section 21 and a tip section 22. Both sections, namely the root section 21 and the tip section 22, comprise up to 10 percent in the spanwise direction of the rotor blade. The radially outmost point of the rotor blade is the so-called tip 221 of the rotor blade 20. The rotor blade 20 furthermore comprises a trailing edge 23 and a leading edge 24. The leading edge 24 typically has a curved and round shape, while the trailing edge 23 may have a sharp or blunt edge. The straight line between the trailing edge 23 and the leading edge 24 is called the chord 27. The chord 27 divides the airfoil into a pressure side 25 and the suction side 26. One of the airfoils is exemplarily shown in FIG. 2. It is to be understood that the rotor blade 20 comprises a plurality of airfoils—one next to the other—from the root section 21 to the tip section 22. These gradually changing airfoils cause the gradual change of the shape of the rotor blade. The airfoil has a lift generating shape in most of the sections of the rotor blade.

It can also be seen that the rotor blade 20 comprises a lightning protection system with a lightning receptor 30 and a lightning conductor cable 41. The lightning conductor cable 41 connects the lightning receptor 30 with the ground via the hub, the nacelle and the tower. In reality, the rotor blade 20 usually comprises several lightning receptors. For sake of clarity, these further lightning receptors have been omitted in FIG. 2.

Figure 3:
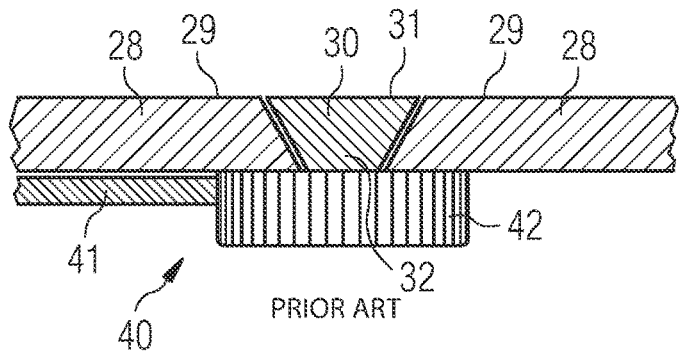
FIG. 3 shows a first example of a conventional lightning receptor.
Figure 4:
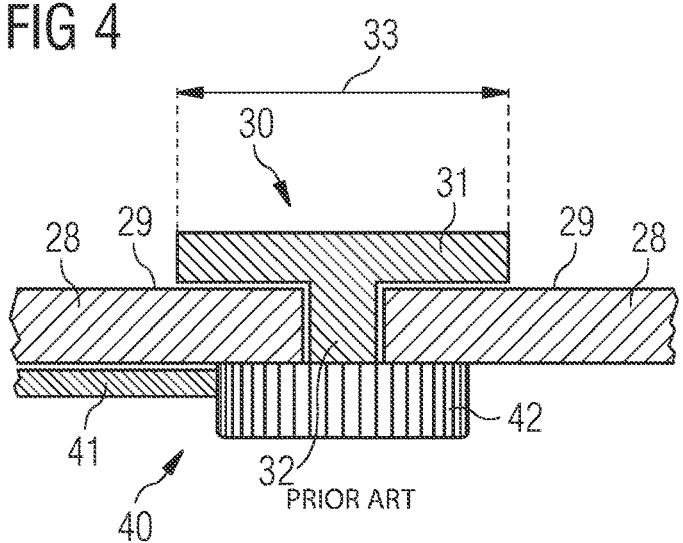
FIG. 4 shows a second example of a conventional lightning receptor.

FIGS. 3 and 4 show two examples of conventional lightning receptors, as known by the prior art.

FIG. 3 illustrates a first example of a conventional lightning receptor 30. This lightning receptor 30 is embedded into the blade shell 28 of the rotor blade. The blade shell 28 of a rotor blade is typically made of a laminate material, for example glass fiber reinforced laminate. Alternatively or additionally, the laminate material may be reinforced by carbon fibers.

In FIG. 3, the lightning receptor 30 is designed such that its surface, the receptor part 31, is flush with the surface 29 of the rotor blade. The surface 29 of the rotor blade is understood as the "outer surface" of the rotor blade. Note that the blade shell 28 normally comprises an outer surface and an inner surface as the rotor blade is typically shallow and comprises an inner cavity in the interior. The receptor part 31 of the lightning receptor 30 is connected to a lightning conductor 40 via the connection part 32 of the lightning receptor 30, wherein the lightning conductor 40 comprises a lightning conductor block 42 and a lightning conductor cable 41. The lightning conductor block 42 is attached, e.g. casted, to the blade shell 28. The lightning receptor 30 may for example be screwed into the lightning conductor block 42. An advantage of a flush and embedded lightning receptor 30 is that its impact on the airflow flowing across the surface 29 is minimum. In particular, noise and aerodynamic drag is minimized.

FIG. 4 shows a second example of a conventional lightning receptor 30 which is connected to a lightning conductor 40. This lightning receptor 30 comprises a receptor part 31 and a connection part 32. The receptor part 31 protrudes from the surface 29 of the rotor blade. The connection part 32 builds the connection between the receptor part 31 and the lightning conductor block 42. It is noted that in practice the division into the receptor part 31 and the connection part 32 is just an artificial one, as the lightning receptor 30 is normally made as one single piece.

FIG. 4 shows the maximum lateral extension 33 of the receptor part 31 of the lightning receptor 30. It can be seen that the lateral extension of the receptor part 31 is equal for the entire height of the receptor part 31. Therefore, the maximum lateral extension is already present at the surface 29 of the rotor blade. For this reason, there is no air layer or the like between the receptor part 31 and the surface 29 of the rotor blade. For this reason, the lightning receptor 30 of FIG. 4 does not feature the advantageous technical effect as the lightning receptor according to the invention.

Figure 5:
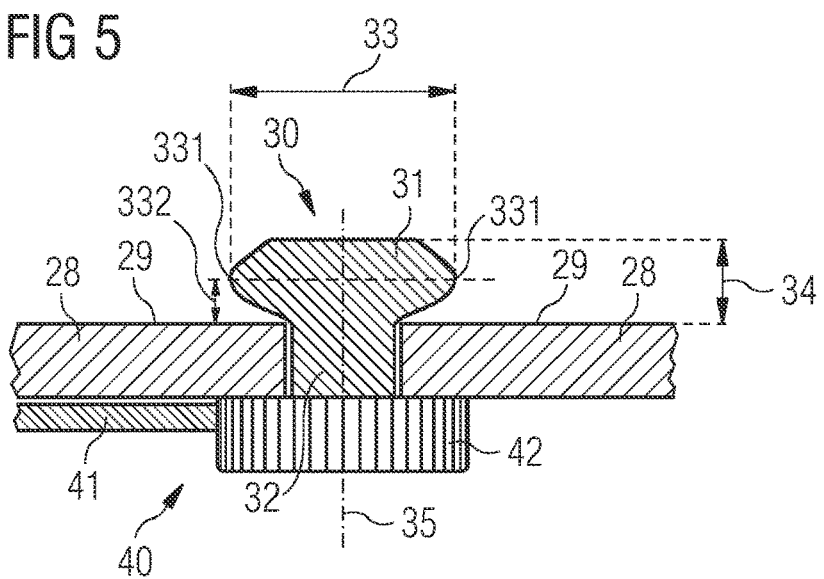
FIG. 5 shows a first embodiment of a lightning receptor according to embodiments of the invention.
Figure 6:
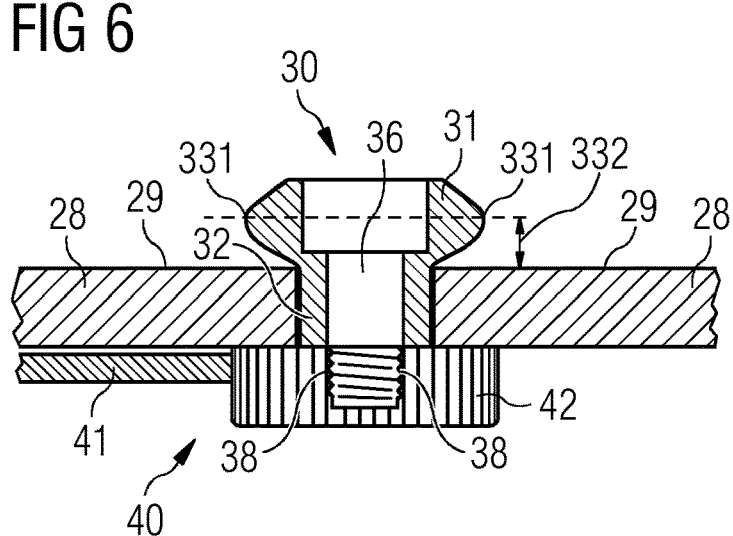
FIG. 6 shows a variation of the first embodiment comprising a through-hole for a fastener.

FIGS. 5 and 6 show a first embodiment of an inventive lightning receptor 30 in a cross-sectional view, taken in a plane perpendicular to the surface 29 of the rotor blade. Again, the lightning receptor 30 comprises a receptor part 31 and a connection part 32. The receptor part 31 is that part of the lightning receptor 30 which protrudes from the surface 29 of the rotor blade, while the connection part 32 builds the connection between the receptor part 31 and the lightning conductor block 42. The lightning conductor block 42 builds, together with the lightning conductor cable 41, the lightning conductor 40.

Note that the lightning receptor 30 has a rotationally symmetric shape. In FIG. 5, the corresponding rotational axis 35 is drawn in. The rotational axis 35 is perpendicular to this portion of the surface 29 of the rotor blade which is in the vicinity of the lightning receptor 30. A rotational symmetric shape is the most natural shape for a lightning receptor and can also be manufactured easily. Furthermore, it does not have to be taken into account how exactly the lightning receptor 30 is screwed into the lightning conductor 40.

The lightning receptor 30 in this embodiment of the invention has its maximum lateral extension 33 spaced apart from the surface 29 of the rotor blade. In other words, the section 331 of the receptor part 31 of the lightning receptor 30 with the maximum lateral extension 33 of the receptor part is spaced apart from the surface 29 of the rotor blade by a certain distance 332.

FIG. 5 also shows that the maximum lateral extension 33 of the receptor part 31 exceeds the maximum extension of the receptor part 31 in a plane perpendicular to the surface. In other words, the lateral extension of the receptor part 31 is greater than its height, i.e. its thickness. This is beneficial, as therefore the lightning attraction potential is maximized while the aerodynamic drag and noise related impact of the lightning receptor is minimized.

FIG. 6 shows a variant of the inventive lightning receptor 30 as illustrated in FIG. 5. The variation consists in a through-hole 36 which is provided at the lightning receptor 30. The through-hole 36 traverses the lightning receptor 30 in the center, i.e. through the rotational axis. The through-hole 36 does not only traverse the receptor part 31, but also the connection part 32 of the lightning receptor 30. The size and the design of the through-hole 36 is aligned with a corresponding opening in the lightning conductor block 42. Thus, a fastener such as a screw can easily be inserted into it. For this purpose, the opening in the lightning conductor block 42 has a thread 38 and the fastener has a corresponding thread 38 at its tip section.

Figure 7:
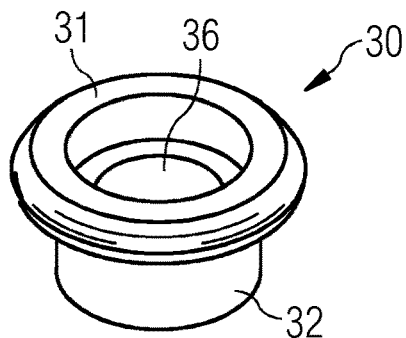
FIG. 7 shows the lightning receptor of FIG. 6 in a perspective view.
Figure 8:
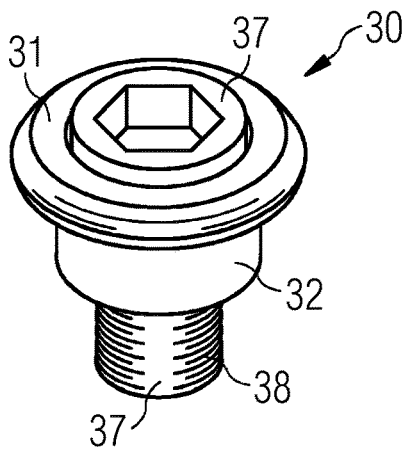
FIG. 8 shows the lightning receptor of FIGS. 6 and 7 in combination with a fastener inserted through the trough-hole.

FIGS. 7 and 8 show a perspective view of the lightning receptor 30 of FIG. 6. Both the receptor part 31, the connection part 32 as well as the through-hole 36 are depicted. In FIG. 8, a fastener 37, namely a screw, is inserted into the through-hole 36. The fastener 37 has a length which exceeds the total height of the lightning receptor such that the tip of the fastener 30 with a corresponding thread 38 corresponds to the opening being prepared in the lightning conductor block.

Figure 9:
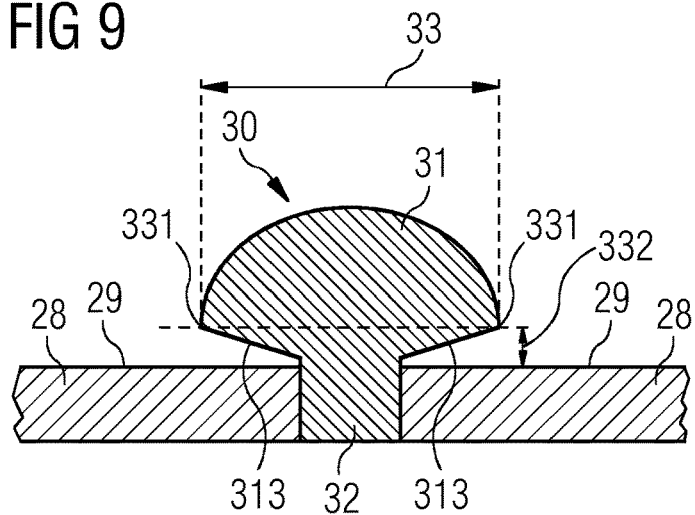
FIG. 9 shows another embodiment of a lightning receptor.
Figure 10:
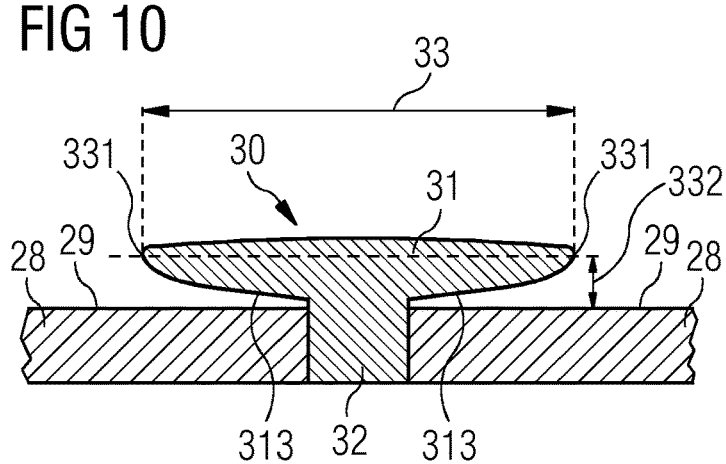
FIG. 10 shows another embodiment of a lightning receptor.
Figure 11:
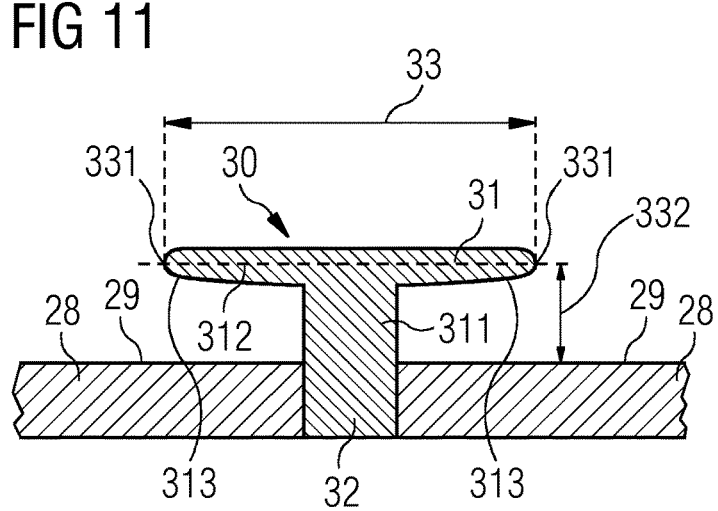
FIG. 11 shows another embodiment of a lightning receptor.

FIGS. 9, 10 and 11 show three further embodiments of inventive lightning receptors 30. For sake of clarity and simplicity, the lightning conductor is omitted in FIGS. 9 to 11.

FIG. 9 shows a lightning receptor 30 with a receptor part 31 which has a relatively pronounced cap. However, the section with the maximum lateral extension 33 is spaced apart from the surface 29 of the rotor blade such that a layer of air is automatically building up between the lower side 313 of the receptor part 31 and the surface of the rotor blade 29. This leads to an improved ability to attract lightning strikes.

FIG. 10 differs from the embodiment as shown in FIG. 9 in that its receptor part 31 is much flatter and wider compared to the one of FIG. 9. In other words, the ratio between the maximum lateral extension 33 and the height, i.e. the maximum extension in a plane perpendicular to the surface is enhanced. This could beneficially lead to a decrease in the aerodynamic drag of the receptor part and might also reduce the noise which is generated by the lightning receptor.

FIG. 11 shows yet another embodiment of the invention. Here, the lightning receptor 30 also comprises a receptor part 31 and a connection part 32, but the receptor part 31 is subdivided into a cap 312 and a stem 311. The stem 311 is a natural prolongation or extension of the connection part 32 of the lightning receptor 30 and has the technical effect that the area which is destined for actually attracting and receiving the lightning strikes is even further put away and separated from the surface 29 of the rotor blade. In other words, the presence of the stem 311 helps to further increase the separation and ensures that the layer, i.e. the area of air, between the receptor part, namely the cap 312, and the surface 29 of the rotor blade remain stable. In particular, the embodiment of FIG. 11 can be referred to as a "mushroom shape" design of a lightning receptor.

Figure 12:
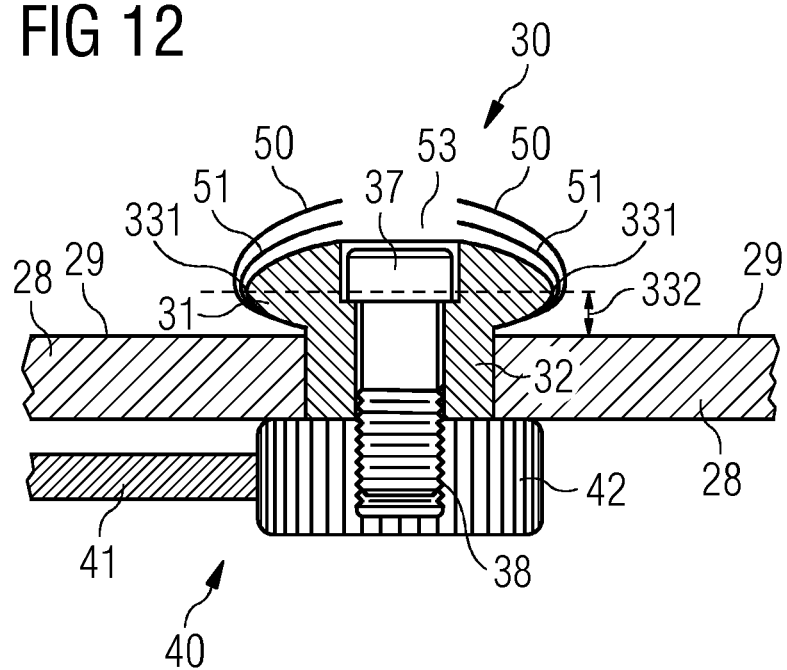
FIG. 12 shows a first embodiment of a cover for the receptor part of a lightning receptor.
Figure 13:
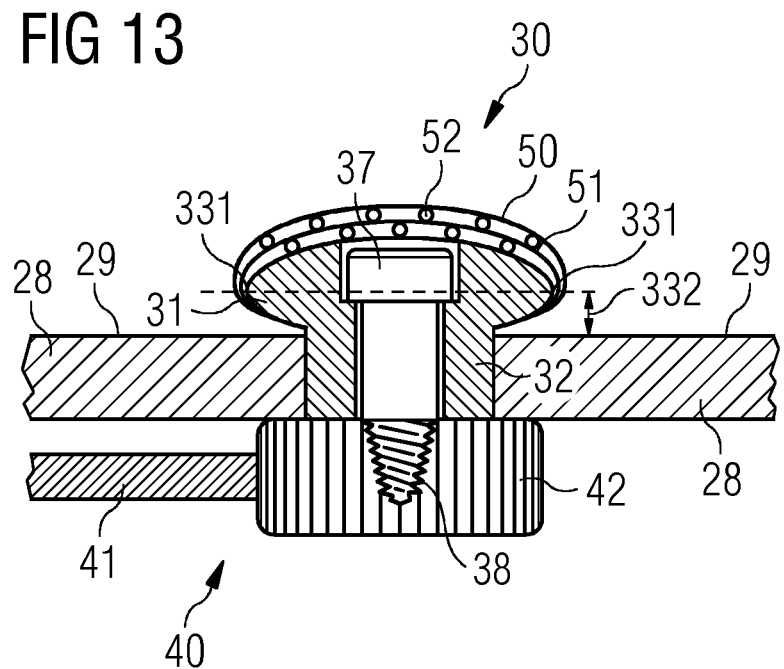
FIG. 13 shows a second embodiment of a cover for the receptor part of a lightning receptor.

FIGS. 12 and 13 show two embodiments of a covered lightning receptor. FIG. 12 shows basically the same or very similar lightning receptor as shown in FIG. 6. The lightning receptor 30 comprises a receptor part 31 and a connection part 32. The entire lightning receptor 30 is connected to the lightning conductor block 42 by means of a threaded fastener 37. The fastener 37 is well fitted into a corresponding through-hole of the lightning receptor and a corresponding opening into the lightning conductor block 42. In contrast to the embodiment as disclosed in FIG. 6, the embodiment as shown in FIG. 12 comprises two covers, namely the cover 50 and the further cover 51. These covers 50, 51 can be understood as disks or flat objects which are mounted on top of the receptor part of the lightning receptor. They are made of rigid material such as metal and make sure that the layer of air which is present between the receptor part 31 and the further cover 51 as well as between the further cover 51 and the cover 50 is maintained during operation of the wind turbine. This layer of air, in combination with the sharp rims of the cover and the further cover, may help to improve the attraction potential of the lightning receptor compared to conventional lightning receptors.

FIG. 13 shows yet another embodiment of such a covered lightning receptor. This time, the cover entirely covers the receptor part 31 and the cover is not made of a rigid metal material but of a foil, such as a flexible sheet. Again, two sheets are present, namely the cover 50 and the further cover 51. As the covers 50, 51 are flexible, it has to be ensured that they maintain and are kept spaced from each other. This is realized by a plurality of spacers 52 which are made of a non-conductive material such as rings.

Note again, that these designs as they are shown in FIGS. 12 and 13 may in principle also be applied to conventional lightning receptors as shown in FIGS. 3 and 4. These conventional lightning receptors may also benefit from such a structured layer comprising electrical conductive cover material and non-conductive material in between the lightning receptor and the cover layer.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A rotor blade of a wind turbine, the rotor blade comprising:
    a lightning protection system with at least one lightning receptor, the at least one lightning receptor comprising a receptor part which protrudes from a surface of the rotor blade to define a gap between the receptor part and the surface of the rotor blade that radially extends from a connection part of the at least one lightning receptor;
    wherein a section of the receptor part with a maximum lateral extension is spaced apart from the surface of the rotor blade.

2. The rotor blade according to claim 1, wherein the lateral extension of the receptor part increases from the surface of the rotor blade until the section of the receptor part with the maximum lateral extension.

3. The rotor blade according to claim 1, wherein the maximum lateral extension of the receptor part is greater than a maximum extension of the receptor part in a plane perpendicular to the surface of the rotor blade.

4. The rotor blade according to claim 1, wherein a curvature of the receptor part is greatest at the section of the receptor part with the maximum lateral extension.

5. The rotor blade according to claim 1, wherein the receptor part comprises a through-hole for inserting a fastener for fixing the at least one lightning receptor to a lightning conductor of the rotor blade.

6. The rotor blade according to claim 1, wherein the receptor part comprises a stem and a cap, and wherein:
    the cap comprises the section of the receptor part with the maximum lateral extension, and
    the stem connects the cap with the surface of the rotor blade, thus contributing further that the section of the receptor part with the maximum lateral extension is spaced apart from the surface of the rotor blade.

7. The rotor blade according to claim 1, wherein:
    the receptor part is at least partially covered by an electrically conductive cover, and
    the electrically conductive cover is at least partially spaced apart from the receptor part by a non-conductive material.

8. The rotor blade according to claim 7, wherein the electrically conductive cover is designed and arranged such with regard to the receptor part that a plurality of air inclusions are present between the electrically conductive cover and the receptor part, thus forming the at least partial spacing of the electrically conductive cover from the receptor part.

9. The rotor blade according to claim 7, wherein:
the receptor part is at least partially covered by at least one further electrically conductive cover,
the at least one further electrically conductive cover is arranged between the non-conductive material and the receptor part, and
the electrically conductive cover is at least partially spaced apart from the at least one further electrically conductive cover by a further non-conductive material.

10. The rotor blade according to claim 9, wherein a plurality of spacers are arranged between the electrically conductive cover and the at least one further electrically conductive cover for ensuring the at least partial spacing of the electrically conductive cover from the at least one further electrically conductive cover.

11. The rotor blade according to claim 7, wherein the electrically conductive cover is a flexible sheet which is capable to adapt to curved surfaces.

12. The rotor blade according to claim 7, wherein the electrically conductive cover is a rigid sheet.

13. The rotor blade according to claim 7, wherein the electrically conductive cover has an opening for feeding a fastener through the electrically conductive cover, wherein the fastener is suitable for fixing the at least one lightning receptor to a lightning conductor of the rotor blade.

14. A wind turbine for generating electricity comprising at least one rotor blade according to claim 1.

15. A lightning receptor for a rotor blade of a wind turbine, comprising:
a receptor part which is arranged and prepared to protrude from a surface of the rotor blade to define a gap between the receptor part and the surface of the rotor blade that radially extends from a connection part of the lightning receptor, wherein a section of the receptor part with a maximum lateral extension is designed to be spaced apart from the surface of the rotor blade.

* * * * *